United States Patent
Stenneth et al.

(10) Patent No.: US 10,353,387 B2
(45) Date of Patent: Jul. 16, 2019

(54) METHOD, APPARATUS AND COMPUTER PROGRAM PRODUCT FOR GROUPING VEHICLES INTO A PLATOON

(71) Applicant: HERE Global B.V., Eindhoven (NL)

(72) Inventors: Leon Stenneth, Chicago, IL (US); Gavril Giurgiu, Deerfield, IL (US); Alex Averbuch, Buffalo Grove, IL (US); Vladimir Boroditsky, Chicago, IL (US); Eric Linder, Downers Grove, IL (US); Dongwook Jang, Lisle, IL (US); Anton Anastassov, Naperville, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/466,273

(22) Filed: Mar. 22, 2017

(65) Prior Publication Data
US 2017/0293296 A1 Oct. 12, 2017

Related U.S. Application Data

(60) Provisional application No. 62/321,440, filed on Apr. 12, 2016.

(51) Int. Cl.
*G06F 19/00* (2018.01)
*G06G 7/70* (2006.01)
(Continued)

(52) U.S. Cl.
CPC ....... *G05D 1/0027* (2013.01); *G01C 21/3438* (2013.01); *G05D 1/0297* (2013.01);
(Continued)

(58) Field of Classification Search
None
See application file for complete search history.

(56) References Cited

U.S. PATENT DOCUMENTS 8,352,111 B2 1/2013 Mudalige
9,396,661 B2 * 7/2016 Okamoto ................. G08G 1/22
(Continued)

OTHER PUBLICATIONS

Extended European Search Report from corresponding European Patent Application No. 17164135.0 dated Jun. 8, 2017, 11 pages.
(Continued)

*Primary Examiner* — Adam D Tissot
(74) *Attorney, Agent, or Firm* — Alston & Bird LLP (57) ABSTRACT

A method, apparatus and computer program products are provided for grouping a plurality of vehicles together into a platoon and using navigation and other available data to optimize the efficiencies of operating the vehicles together as a platoon. Methods may include receiving a first trip request including a first vehicle identification, trip destination, and associated preferences; receiving a second trip request including a second vehicle identification, trip destination, and associated preferences; and generating a platooning plan including assignment of platoon leader to the first vehicle identification and a joining location where a vehicle of the first vehicle identification is to form a platoon with a vehicle of the second identification. Methods may include joining the first vehicle and the second vehicle in a secure vehicle-to-vehicle communication session.

19 Claims, 7 Drawing Sheets

(51) Int. Cl.
| | |
|---|---|
| G05D 1/02 | (2006.01) |
| G08G 1/00 | (2006.01) |
| G05D 1/00 | (2006.01) |
| G01C 21/34 | (2006.01) |
| G06Q 20/10 | (2012.01) |
| G06Q 10/04 | (2012.01) |
| G06Q 10/06 | (2012.01) |

(52) U.S. Cl.
 CPC ..... *G06Q 10/047* (2013.01); *G06Q 10/06315* (2013.01); *G06Q 20/10* (2013.01)

(56) References Cited

U.S. PATENT DOCUMENTS

2003/0182183 A1* 9/2003 Pribe ............... G06Q 10/06 705/13
2014/0316865 A1 10/2014 Okamoto

OTHER PUBLICATIONS

Wikipedia: "Vehicular ad hoc network"; Internet Article, Jan. 24, 2016; XP055377065, Retrieved from the Internet: <URL: https://en.wikipedia.org/w/index.php?title=Vehicular_ad_hoc_network&oldid=701412113>. [retrieved May 30, 2017], 4 pages.
Wikipedia: "Autonomous car"; Internet Article, Apr. 8, 2016, XP055377072, Retrieved from the Internet: <URL: https://en.wikipedia.org/w/index.php?title=Autonomous_car&oldid=714210409>. [retrieved on May 30, 2017], 19 pages.
Wikipedia: "Platoon (automobile)", Internet Article, Apr. 1, 2016, XP055377069, Retrieved from the Internet: <URL: https://en.wikipedia.org/w/index.php?title=Platoon_(automobile)&oldid=713053477>. [retrieved on May 30, 2017], 4 pages.
Chen, Wai: "Vehicular Communications and Networks: Architectures, Protocols, Operation and Deployment"; In: "Vehicular Communications and Networks: Architectures, Protocols, Operation and Deployment", Apr. 1, 2015 (Apr. 1, 2015), Woodhead Publishing, XP055377136, 31 pages.
Campolo, Claudia et al.; "Vehicular ad hoc Networks: Standards, Solutions, and Research—2015th Edition"; In: "Vehicular ad hoc Networks: Standards, Solutions, and Research—2015th Edition", Jun. 1, 2015 (Jun. 1, 2015), Springer, XP055377153, 159 pages.
Winner, Hermann et al.; "Handbuch Fahrerassistenzsysteme: Grundlagen, Komponenten und Systeme fur aktive Sicherheit und Komfort"; In: "Handbuch Fahrerassistenzsysteme: Grundlagen, Komponenten und Systeme fur aktive Sicherheit und Komfort", Apr. 20, 2015 (Apr. 20, 2015), Springer, XP055377165; 95 pages.
Wikipedia: "TomTom", Internet Article, Mar. 30, 2016 (Mar. 30, 2016), XP 055377114, Retrieved from the Internet: <URL: https://en.wikipedia.org/w/index.php?title=TomTom&oldid=712638270 [retrieved on May 30, 2017], 12 pages.
Office Action for European Application No. 17 164 135.0 dated Jan. 23, 2019, 10 pages.
Held, G., *Inter and Intra-Vehicle Communications 1st Edition,* Auerbach Publication (2007) 148 pages.
Fiorini, M. et al., *Clean Mobility and Intelligent Transport Systems,* The Institution of Engineering and Technology (2015) 148 pages.
Laouiti, A. et al. (Editors), *Vehicular Ad-hoc Networks for Smart Cities,* First International Workshop, 2014, Springer (2014) 43-49.
Meyer, G. et al. (Editors), *Road Vehicle Automation (Lecture Notes in Mobility),* Springer (Jun. 8, 2014) 100 pages.
Wikipedia: "Pairing (computing)", Internet Article, [online] [retrieved Jan. 15, 2019]. Retrieved from the Internet: <URL: https://en.wikipedia.org/w/index.php?title=Pairing_(computing)&oldid-518755783>. (dated Oct. 19, 2012) 1 page.
Wikipedia: "Session key", Internet Article, [online] [retrieved Jan. 15, 2019]. Retrieved from the Internet: <URL: https://en.wikipedia.org/w/index.php?title=Session_key&oldid=678764831>. (dated Aug. 31, 2015) 1 page.

\* cited by examiner

METHOD, APPARATUS AND COMPUTER PROGRAM PRODUCT FOR GROUPING VEHICLES INTO A PLATOON

CROSS-REFERENCE TO RELATED APPLICATIONS

This application claims priority to and the benefit of U.S. Provisional Patent Application Ser. No. 62/321,440, filed on Apr. 12, 2016, the contents of which are incorporated by reference herein in their entirety.

TECHNOLOGICAL FIELD

Embodiments of the present invention relate generally to a method, apparatus, and computer program product for grouping and monitoring a plurality of vehicles into a platoon, and more particularly, to navigation related data to facilitate the grouping of vehicles into a platoon in an efficient manner.

BACKGROUND

The number of vehicles on roadways is increasing at a rate that outpaces the construction of new roadways and additional roadway capacity. Further, budget constraints limit the ability to construct new roadways and to handle the aging roadway infrastructure presently in place. To address the challenges posed by the growing traffic volumes and a lack of resources or ability to widen or add roadways, alternative measures for increasing efficiency of existing roadways is needed. Instead of adding new roadways or adding vehicle lanes to existing roadways, methods of increasing the efficiency of use of existing roadways can reduce traffic congestion, increase roadway safety, and prolong the life of existing roadway infrastructure.

BRIEF SUMMARY

A method, apparatus and computer program product are therefore provided according to an example embodiment of the present invention for grouping a plurality of vehicles together into a platoon and using navigation and other available data to optimize the efficiencies of operating the vehicles together as a platoon.

In some embodiments, a method may be provided, the method including: receiving a first trip request including a first vehicle identification, current location, trip destination, and associated preferences; receiving a second trip request including a second vehicle identification, current location, trip destination, and associated preferences; and generating a platooning plan including assignment of platoon leader to the first vehicle identification and a joining location where a vehicle of the first vehicle identification is to form a platoon with a vehicle of the second identification. Methods may include joining the first vehicle and the second vehicle in a secure vehicle-to-vehicle communication session. Methods may facilitate payment between an account associated with the first vehicle identification and an account associated with the second vehicle identification. The preferences associated with the trip requests may include a planned route, planned stops, and a desired time of arrival at the trip destination. The platooning plan may include a platoon route, platoon planned stops, and a platoon target arrival time generated in response to the associated preferences of the first trip request and the second trip request. Methods may optionally include receiving a join request including a third vehicle identification, a trip destination, current location, and associated preferences, and joining a vehicle associated with the third vehicle identification to the platooning plan.

Embodiments may provide an apparatus including at least one processor and at least one memory including computer program code. The at least one memory and the computer program code may be configured, with the processor, to cause the apparatus to: receive a first trip request including a first vehicle identification, trip destination, and associated preferences; receive a second trip request including a second vehicle identification, trip destination, and associated preferences; and generate a platooning plan including assignment of a platoon leader to the first vehicle and a joining location where a vehicle of the first vehicle identification is to form a platoon with a vehicle of the second vehicle identification. The apparatus may be caused to join the first vehicle and the second vehicle in a secure vehicle-to-vehicle communication session. The apparatus may facilitate payment between an account associated with the first vehicle and an account associated with the second vehicle. The associated preferences may include a planned route, planned stops, and a desired time of arrival at the trip destination. The platooning plan may include a platoon route, platoon planned stops, request to break up platoon due to upcoming features in the map (e.g. slope, curvature, etc.) and a platoon target arrival time generated in response to the associated preferences of the first trip request and the second trip request. The apparatus may optionally be caused to receive a join request including a third vehicle identification, a trip destination, and associated preferences, and join a vehicle associated with the third vehicle identification to the platooning plan.

Embodiments may provide a computer program product including at least one non-transitory computer-readable storage medium having computer-executable program code portions stored therein. The computer-executable program code portions including program code instructions for: receiving a first trip request including a first vehicle identification, trip destination, and associated preferences; receiving a second trip request including a second vehicle identification, current location, trip destination, and associated preferences; and generating a platooning plan including assignment of a platoon leader to the first vehicle identification and a joining location where a vehicle of the first vehicle identification is to form a platoon with a vehicle of the second vehicle identification. The computer program product may include program code instructions for joining the first vehicle and the second vehicle in a secure vehicle-to-vehicle communication session. The computer program product may include program code instructions to facilitate payment between an account associated with the first vehicle and an account associated with the second vehicle. The associated preferences may include a planned route, planned stops, and a desired time of arrival at the trip destination. The platooning plan may include a platooning route, platoon planned stops, and a platoon target arrival time generated in response to the associated preferences of the first trip request and the second trip request. The computer program product may optionally include program code instructions for receiving a join request including a third vehicle identification, a trip destination, and associated preferences, and joining a vehicle associated with the third vehicle identification to the platooning plan.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION

Some example embodiments will now be described more fully hereinafter with reference to the accompanying drawings, in which some, but not all embodiments are shown. Indeed, the example embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term "circuitry" refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or application specific integrated circuit for a mobile phone or a similar integrated circuit in a server, a cellular network device, or other network device.

In general, some embodiments presented herein are directed to grouping vehicles together into platoons for travel from an origin to a destination across a transportation network. A route may be defined as a path between a particular origin and a particular destination, where multiple routes may exist between those same origin and destination points. A trip may be a particular route taken by a vehicle between an origin and a destination. Thus, while a route is not vehicle specific, each trip is necessarily specific to the vehicle making that trip. Further, while example embodiments described herein may be directed primarily toward vehicles such as cars, trucks, and buses, traveling along roadways, example embodiments may be implemented for vehicles such as trains, aircraft, boats, or the like. While the benefits of the invention described herein with regard to road-going vehicles supports increased efficiency of vehicles traveling along an existing network of roads, implementations of the invention may provide improved air-traffic safety and a reduction in air-traffic congestion, or similar benefits among water vessels or vehicles traveling along railways.

Grouping vehicles into platoons is a method that may increase the capacity of a network of roadways. A platoon of vehicles may be a group of vehicles that travel with a predefined distance or range of distance between them, and in some cases, vehicles may be coupled to one another via mechanical means or via electrical/computer-based means. Electrical or computer-based means for coupling vehicles may be performed through partial automation with distronic or adaptive cruise control that helps a driver maintain a safe distance from a leading vehicle, or full automation such as with driverless vehicles that follow a lead vehicle without driver input. When groups of vehicles are assembled into platoons, many benefits may be achieved. One benefit may include improved energy efficiency of the vehicles involved through less unnecessary braking resulting in accordion-like fluctuations in traffic and increased fuel efficiency achieved by following vehicles drafting behind leading vehicles (e.g., reducing the forces caused by drag). Road capacity may increase as a result of grouping vehicles into platoons as following distances between vehicles may be reduced, while vehicle speeds may be more consistent (e.g., less stop-and-go). Grouping vehicles into pontoons may also increase safety through more consistent traffic flow and less individual driver responsibility.

As noted above, grouping of vehicles into platoons may be achieved in vehicles having no automation, such as conventional, human-driven automobiles, vehicles having partial automation, such as a human driver with driver assistance software features (e.g., adaptive cruise control), vehicles having full automation where they are driven via computer without requiring a driver, or any combination thereof. The maximum benefit of grouping of vehicles may be achieved when vehicles are fully automated to be driven by computers as vehicle-to-vehicle communications may allow shorter following distances between vehicles and communication of vehicles within one platoon to vehicles within another platoon. Example embodiments described herein may use computers and computer program products to facilitate the grouping of vehicles into platoons, and in the case of fully autonomous, driverless vehicles, may also control the vehicles to join them to platoons. In either scenario, an apparatus that supports communication between vehicles may be used to facilitate the joining and departing of vehicles from platoons, along with determining the appropriate platoon for a vehicle to join.

Figure 1:
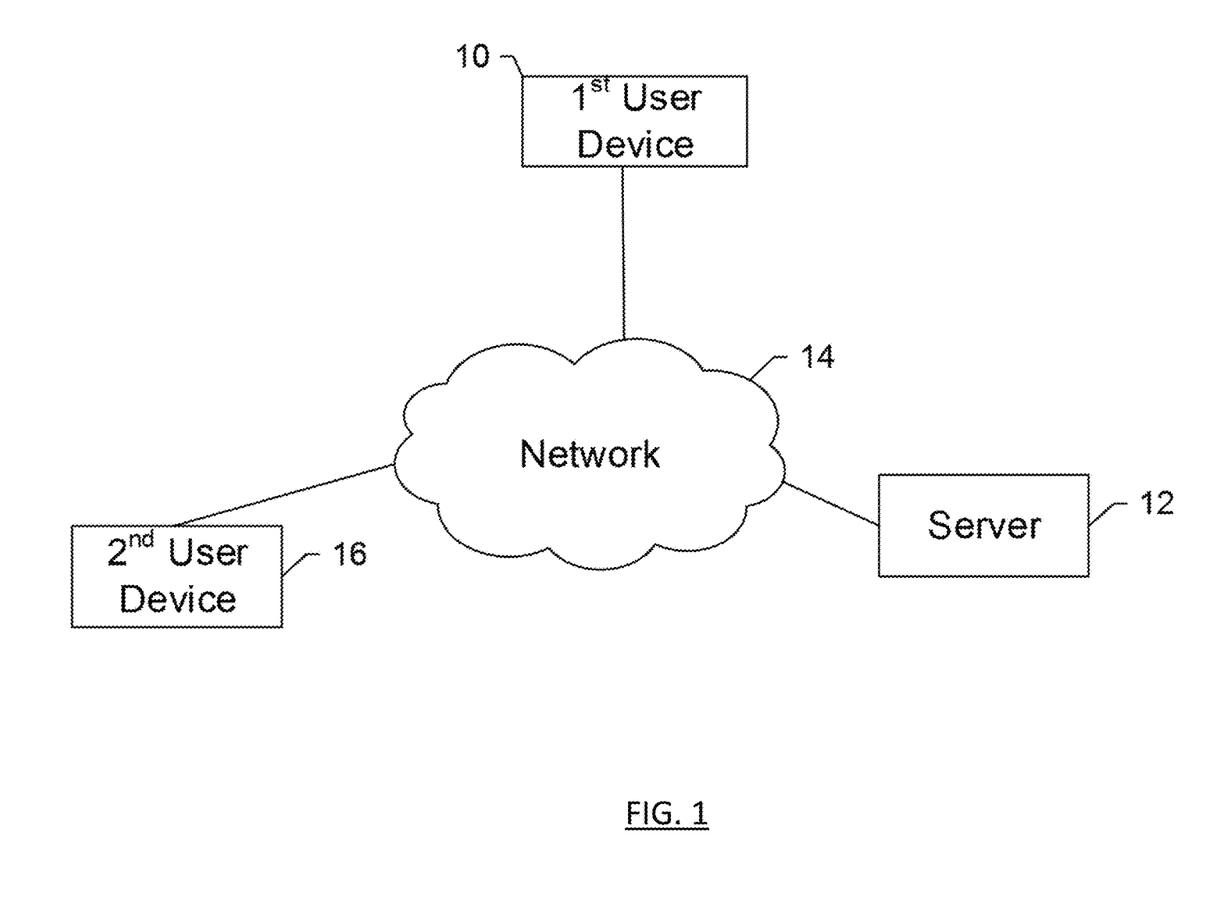
FIG. 1 is block diagram of a system that may be specifically configured in accordance with an example embodiment of the present invention.

Referring now of FIG. 1, a system that supports communication, typically wirelessly, between a first user device 10, a second user device 16, and a server 12 or other network entity (hereinafter generically referenced as a "server") is illustrated. As shown, the user devices and the server may be in communication via a network 14, such as a wide area network, such as a cellular network or the Internet or a local area network. However, the user devices and the server may be in communication in other manners, such as via direct communications between the user devices and the server, or directly between the user devices 10 and 16.

The user devices 10 and 16 may be embodied by a number of different devices including mobile computing devices, such as a personal digital assistant (PDA), mobile telephone, smartphone, laptop computer, tablet computer, vehicle navigation system, or any combination of the aforementioned, and other types of voice and text communications systems. The server 12 may also be embodied by a computing device and, in one embodiment, is embodied by a web server. Additionally, while the system of FIG. 1 depicts a single server, the server may be comprised of a plurality of servers which may collaborate to support activities of the user devices.

Figure 2:
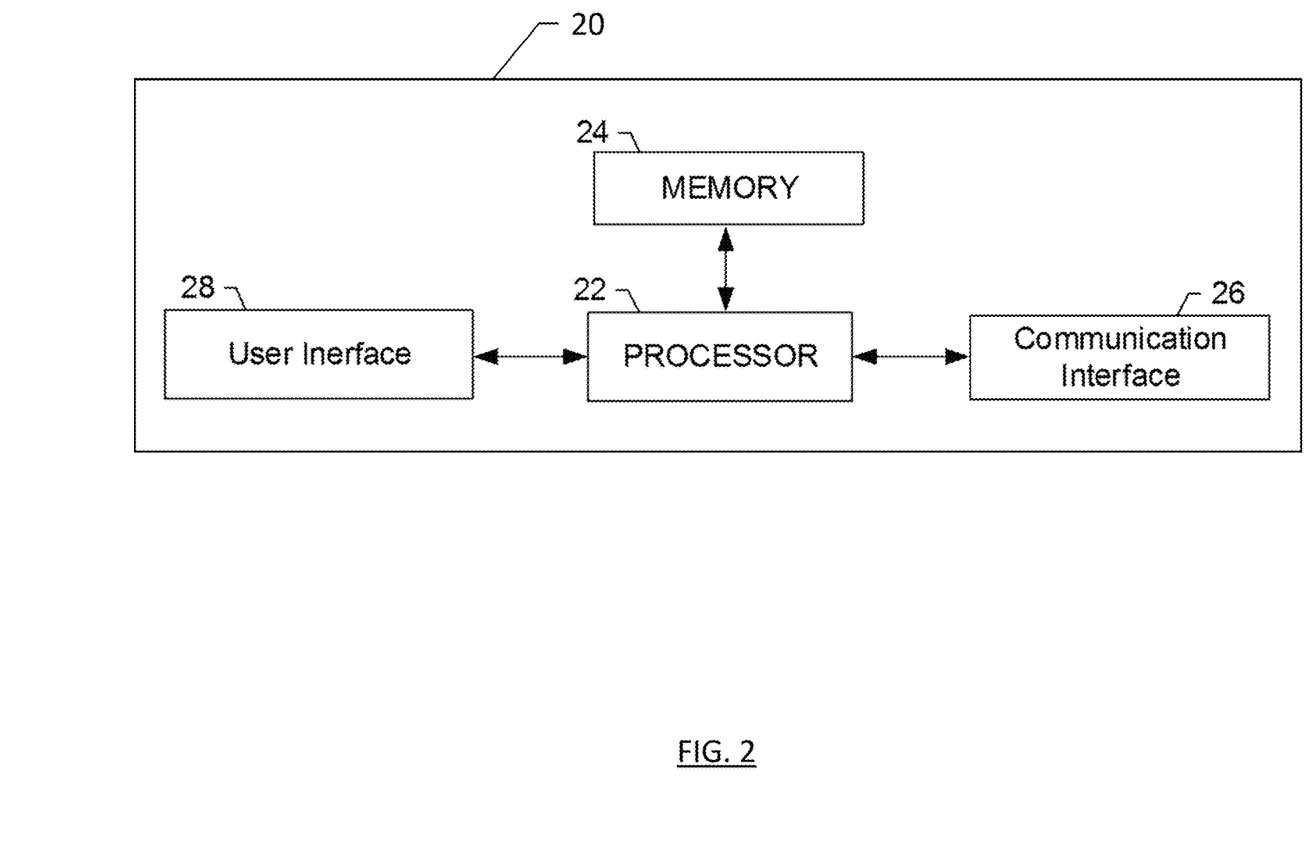
FIG. 2 is a block diagram of an apparatus that may be specifically configured in accordance with an example embodiment of the present invention.

Regardless of the type of device that embodies the user devices 10 or 16, the user devices may include or be associated with an apparatus 20 as shown in FIG. 2. In this regard, the apparatus may include or otherwise be in communication with a processor 22, a memory device 24, a communication interface 26 and a user interface 28. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 22 (and/or co-processors or any other processing circuitry assisting or otherwise associated with the processor) may be in communication with the memory device 24 via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus 20 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a computing device 10 configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a head mounted display) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In one embodiment, the processor may also include user interface circuitry configured to control at least some functions of one or more elements of the user interface 28.

Meanwhile, the communication interface 26 may be any means such as a device or circuitry embodied in either hardware or a combination of hardware and software that is configured to receive and/or transmit data between the computing device 10 and a server 12. In this regard, the communication interface 26 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with the head mounted displays 10, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device.

The user interface 28 may be in communication with the processor 22, such as the user interface circuitry, to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. The user interface may also be in communication with the memory 24 and/or the communication interface 26, such as via a bus.

The communication interface 26 may facilitate communication between the different user devices and/or between the server 12 and the user devices 10 or 16. The communications interface 26 may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Example embodiments described herein may implement a method of grouping vehicles together in a platoon that is facilitated by a platoon server 12, which may be remotely located from one or all of the vehicles of a platoon, or the grouping of vehicles together may be facilitated exclusively between user devices (e.g., the first user device 10 and the second user device 16), operating collaboratively as collaborating devices, or where one device operates as the master user device while other user devices operate as slave devices. The user devices may be mobile devices within a vehicle, the navigation system of a vehicle, or integrated with vehicle controls such as in an autonomous, driverless vehicle. The user devices may be configured with hardware and software to facilitate reliable vehicle-to-vehicle communication. The communication may be performed via communications interface 26 of apparatus 20 as described above, and the user devices may use one or more communication protocols.

In the interest of safety, redundant communication protocols may be used to ensure reliable, consistent communication between devices. For example, while two vehicles may be in communication with each other (e.g., the respective user devices of each vehicle are in communication with one another) via a 4G communication protocol using cellular phone towers as communication access points. Upon entry into a tunnel, the 4G communication may be compromised. A secondary communication protocol, such as a near-field communication protocol (e.g., Bluetooth™) may be used to supplement the 4G communication protocol in the event 4G communications are lost or compromised. In this manner, communication between vehicles may be maintained.

Grouping of vehicles into platoons may require advanced knowledge of an intended destination or waypoint for a vehicle. Routes may be planned in advance in response to a user providing an indication of a destination. An origin can be identified by the current location of a user/vehicle, or independently entered by a user if different than their location when selecting the destination. Embodiments described herein may implement a central, cloud-based platoon matching exchange, which may be hosted by a platoon server 12, which could continually ingest origins, destinations, and acceptable parameters of a trip for a particular vehicle in order to appropriately match each vehicle with a platoon that would most appropriately and efficiently align with the user's planned trip. Parameters for a trip may include, for example, waypoints, types of roadways (e.g., avoiding interstate highways or preferring interstate highways), other vehicles making the trip associated with the user (e.g., if a user has a friend, spouse, etc. that is making the same trip in a different vehicle), timing of the trip (e.g., departure or desired arrival) etc. The trip parameters including origin and destination may be used by the platoon matching exchange to align vehicles with suitable platoons. The destination of the vehicle can be inputted or derived from historic vehicle sensor data. Trip parameters for a given vehicle may optionally include a planned route, planned stops, expected speed, current position, fuel economy, vehicle dynamics properties (e.g., size, shape, frontal area, drag coefficient, weight, etc.), and preferences regarding a drafting train type. Each of these trip preferences may be broadcast to the server 12 over a secure wireless link together with the trip requirements (origin, destination, and possibly time of departure or arrival).

Figure 3:
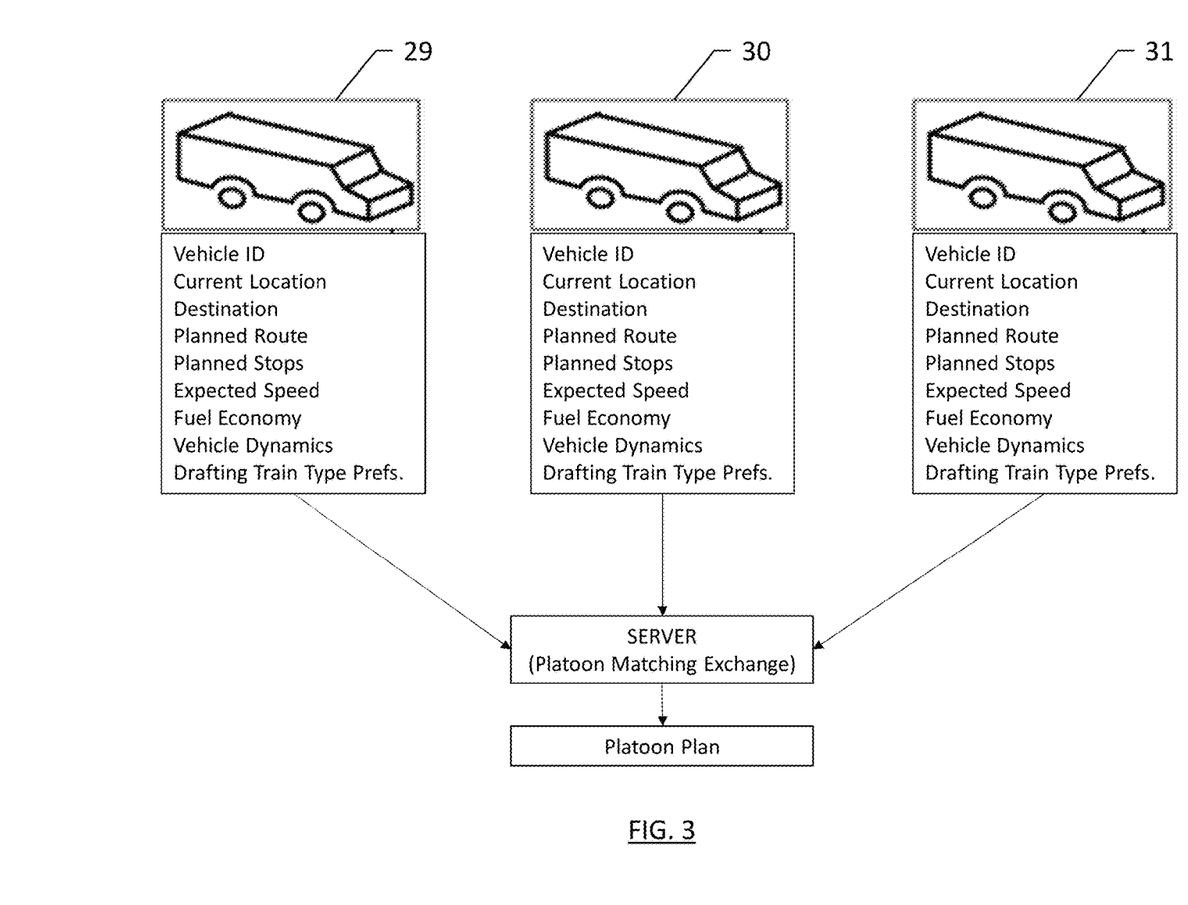
FIG. 3 is an illustration of a plurality of vehicles providing trip requests to a platoon server in order to facilitate the formation of a platoon according to an example embodiment of the present invention.

FIG. 3 illustrates an example embodiment in which three vehicles 29, 30, and 31, each broadcast their trip information including an identification, a current location, a destination, planned route, planned stops, expected speed, fuel economy, and vehicle dynamics. Also included may be a preference for drafting when in the platoon. For example, some vehicles may have a preference to not be in the front of a platoon or not be in the rear of a platoon. The server may then calculate a platoon plan for the vehicles including a joining location for each vehicle (which may be the same point or they may be different points along the route), a join time, a leader identification, follower identification(s), destination, route, and any necessary stops.

A drafting preference that may be included in broadcast trip information or associated with a profile of a particular vehicle or driver may include sole leader, rotating leader, or follower, for example. A sole leader may be self-appointed during an initial broadcast of the planned trip. A sole leader may have control of the average speed, planned stops, and may enable a leader to accept payments from platoon participants as will be described further below. A leader may also be appointed when a vehicle joins a train, and based on an analysis of the efficiency and/or aerodynamic profile of the vehicle, the vehicle providing the greatest efficiency to the platoon may be assigned to be the leader. The remainder of the platoon may be re-ordered according to an efficiency calculation to organize the platoon into the most efficient order possible. If no leader is nominated through an efficiency calculation, and no leader is self-appointed, a rotating leader may be used, where the vehicle holding the lead will rotate periodically. For example, a Belgian tourniquet method of drafting rotation may be used to rotate vehicles through the lead position.

As the lead position of a platoon may encounter the largest wind resistance, the efficiency gains of a platoon may be relatively lower for the lead vehicle than for the following vehicles. Accordingly, the platoon matching exchange operating via the platoon server may facilitate financial compensation for a platoon leader based on the calculated efficiency gains of the platoon that are not realized by the platoon leader. In a rotating leader embodiment, these leader position may be shared such that payments are unnecessary.

According to an example embodiment of the creation of a platoon, a platoon server may receive trip broadcasts from two trucks departing from a first origin, both with a common destination, and a desired arrival time before a particular date and time. The platoon server may also receive a trip broadcast from a third truck departing from a second origin and having a destination within a predetermined distance of the common destination of the first two trucks. Each of the trucks may or may not have a planned departure time entered as a parameter for the trip. The platoon matching exchange functionality of the platoon server may determine an optimal departure time for departure for each of the three trucks, and a meeting point whereupon the first two trucks will join up with the third truck to form a three-truck platoon. Depending upon the departure points and the meeting point, the optimal departure times may differ between participating vehicles. The platoon matching exchange may add vehicles to this platoon if a planned vehicle trip suitably matches the route of the three-truck platoon. The platoon matching exchange may plan optimal, common routes, step-by-step navigation, and separation points where vehicles may leave the platoon when the routes no longer coincide (e.g., as the destinations are approached). According to some embodiments, the platoon matching exchange may further plan optimal rest times and locations, and may minimize refueling costs by using a comprehensive fuel station database with real-time or substantially real-time prices.

Figure 4:
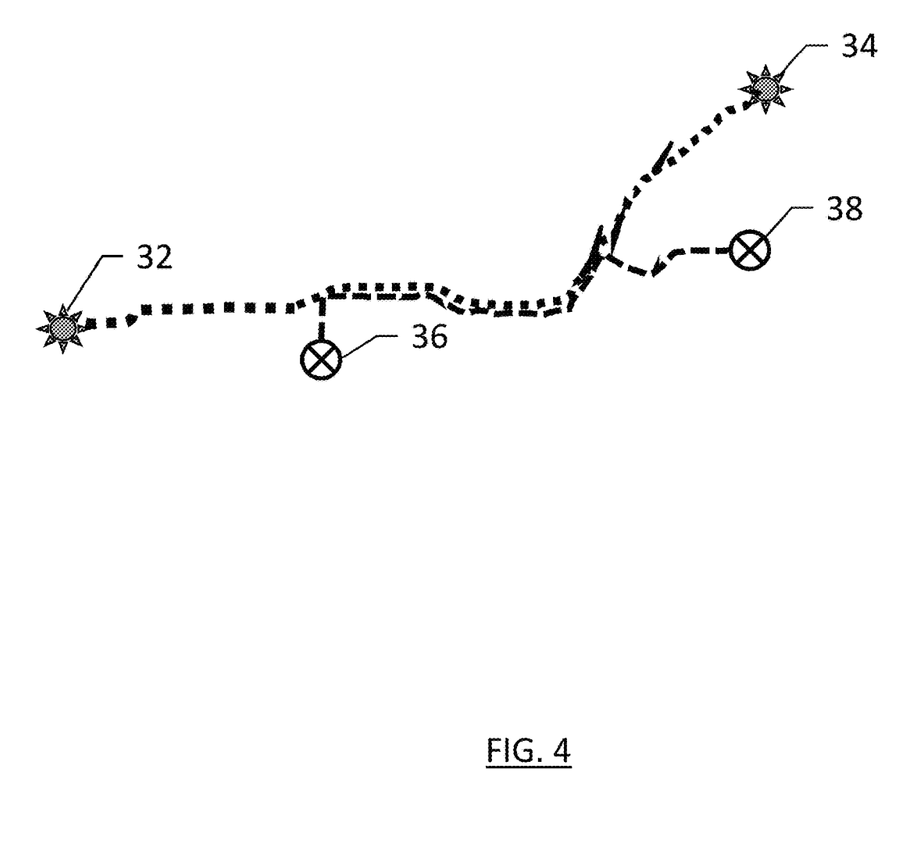
FIG. 4 is an illustration of two routes of two different vehicles for which a platoon plan may be generated for a portion of their respective trips according to an example embodiment of the present invention.

The platoon matching exchange may align routes of vehicles to find the optimal platoons for each vehicle to join. Vehicles may begin in substantially different locations, and have vastly different destinations. However, their routes may align for a portion of their respective trips. The platoon matching exchange may determine, such as via processor 22 of an apparatus 20 functioning as the platoon server, if there are any preferred platoons, and determine a hierarchy or preference for available platoons, or create a new platoon based upon the planned trips. While some platoons may have vehicles with routes that match at 95% of the distance of their trips, other platoons may have vehicles with routes that match at 20% of their respective trips. FIG. 4 illustrates an example embodiment in which a Vehicle A has an origin of 32, and a destination of 34, while Vehicle B has an origin of 36, and a destination of 38. The scale of the routes of FIG. 4 is not material, as the distances from origin to destination may be a few miles, or may be on the order of hundreds of miles. Regardless, the platoon matching exchange may determine that the routes and trip parameters of Vehicles A and B are appropriate for grouping into a platoon along the common portion of their route.

According to some embodiments described herein, a vehicle may be grouped into multiple platoons along a route. For example, a platoon may be heading east to west and a vehicle may be joined to that platoon by the platoon matching exchange during a westbound portion of that vehicle's trip. The vehicle may exit that platoon as instructed by the platoon matching exchange at a predefined exit point, and may join a northbound platoon as instructed by the platoon matching exchange. The vehicle may be instructed to await the northbound platoon or travel at an increased speed to meet up with the northbound platoon if the northbound platoon is not ideally timed. Further, vehicles may be instructed to travel without being grouped into a platoon for a portion of their trip at the beginning of the trip, the end of the trip, or along a portion in the middle of their trip between two different platoons. The platoon matching exchange may establish the most efficient route and one or more platoons for a vehicle to join along their route to maximize the vehicle travel within a platoon.

When a vehicle joins a platoon, the platoon matching exchange may facilitate a secure vehicle-to-vehicle pairing to allow direct, secure vehicle-to-vehicle sharing of information such as notifications, sensor information, navigation information, vehicle control information, emergency conditions, etc. Such a joining of vehicles may enable the vehicles to function without further assistance from the platoon server throughout their involvement in the platoon. This may reduce bandwidth requirements for the platoon server and may help reduce latency that could be introduced through communications between vehicles requiring an intermediary.

While example embodiments have been described with respect to vehicles including drivers, various embodiments described herein may be implemented in driverless vehicles with no passengers, where the vehicle is a transit vehicle for the shipment of goods. The vehicle may include a "user device" that is embodied by the vehicle control system that controls the vehicle speed and direction.

The above-described embodiments illustrate how vehicles may be matched to platoons along their route, or new platoons may be created based on common portions of routes. However, platoons of vehicles are not appropriate for all travel types and conditions. Example embodiments described herein may regulate platoon operation through identification of routes, conditions, and other factors which may influence the effectiveness and safety of operating vehicles in platoons. For example, certain sections of roads may be in appropriate for platooning. Roadways with narrow lanes, construction, or weather related conditions such as black ice or snow may be deemed inappropriate for operation of platoons of vehicles. Further, road closures, detours, roadway restrictions, etc. may be determined by the platoon matching exchange to be inappropriate for operation of platoons of vehicles. The information regarding the roadways may be communicated in real time to user devices 10, 16 and/or to server 12, and the platoon matching exchange may evaluate roadway conditions (weather, construction, accidents, closures, etc.) to determine the appropriateness of operation of platoons of vehicles.

The platoon matching exchange may further determine platoon sizes that may be appropriate for certain roads or road conditions. Long, straight, flat sections of interstate highway may be appropriate for large platoons of vehicles, while mountainous roads with steep grades and sharp turns may be inappropriate for large platoons of vehicles. Further, the platoon matching exchange may be aware of the size and type of vehicles traveling along routes and may use this understanding to determine if the vehicle should join a platoon or not. The platoon matching exchange may determine that a maximum platoon size for a particular stretch of road or certain road conditions to be no more than five trucks with conventional 53-foot long trailers. However, the same stretch of road may have a maximum platoon size of ten passenger vehicles (e.g., sedans, sport-utility vehicles, minivans, etc.). The platoon matching exchange may optionally combine different vehicle types into a single platoon, and may adjust the maximum platoon size based on the combination of types of vehicles.

Figure 5:
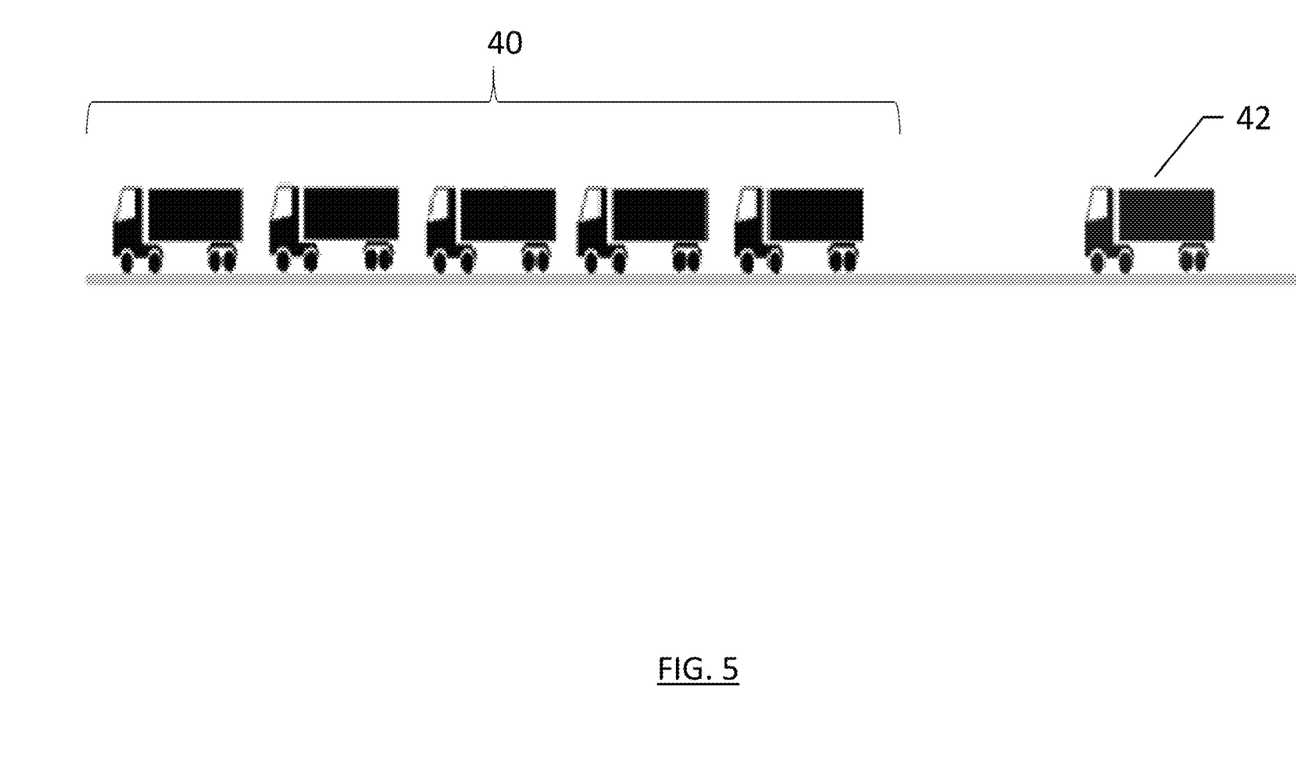
FIG. 5 is an illustration of a platoon receiving a join request from another vehicle according to an example embodiment of the present invention.

FIG. 5 illustrates an example embodiment of a platoon 40 of trucks traveling along a route. The maximum platoon size as established by the platoon matching exchange may be five trucks of the type illustrated, such that a truck 42 traveling along the same route may not be joined to the platoon 40. According to some embodiments, vehicles traveling along a route may request to join a platoon. In the illustrated embodiment of FIG. 5, the user device of truck 42 may send a request to the platoon matching exchange, operating for example on server 12. If platoon 40 was below the maximum platoon size, a join request may be granted and the platoon matching exchange may direct the truck 42 to join the platoon 40.

The platoon matching exchange may optionally determine whether a vehicle may join a platoon through methods beyond those of whether a platoon is at the maximum allowed platoon size. For example, the platoon matching exchange may evaluate the compatibility of vehicles with each other to determine if they would be appropriate to be combined into a platoon. Passenger cars may not be compatible with large cargo trucks in terms of size, speed, etc. The platoon matching exchange may optionally consider fuel economy savings in determining a platoon. For example, if two tractor-trailer trucks are driving in a platoon with a relatively short following distance, the wind resistance or drag may be substantially decreased, increasing the fuel economy for the trucks participating in the platoon. In the consideration of fuel economy, the platoon matching exchange may consider the frontal area and drag coefficient of vehicles in order to determine if their joining a platoon will benefit the fuel economy of the platoon. The platoon matching exchange may also use the frontal area and drag coefficient of a vehicle in determining an order within a platoon. A vehicle with a low drag coefficient and a large frontal area may be well-suited to be a leader of a platoon, while a vehicle with a higher drag coefficient may be more appropriately suited for a trailing position in the platoon to draft a more aerodynamic vehicle.

According to some embodiments, the order of vehicles in a platoon may be determined based on the portion of the route the vehicles are traveling with the platoon. For example, a vehicle that is going to be departing from the platoon earliest may be positioned at the rear of the platoon to facilitate a seamless transition when the vehicle departs from the platoon. The order of vehicles in the platoon may optionally be determined based on an estimated time of arrival, distance to a vehicle's destination, fuel levels of the vehicles, etc. Further, each of these factors may contribute to the order of vehicles in a platoon such that various factors may determine the order of vehicles in the platoon.

Example embodiments described herein may dynamically coordinate platoons and also dynamically calculate the appropriate density for platoons. For example, platoon density can be determined based on time of day, weather, road characteristics (straight/curvy, flat/steep grade, etc.), and spatial constraints (e.g., a bounding box). Having detailed information (location, speed, number of vehicles in each platoon, etc.) from all platoons, the platoon matching exchange can determine the areas with a high density of platoons and warn other platoons.

Figure 6:
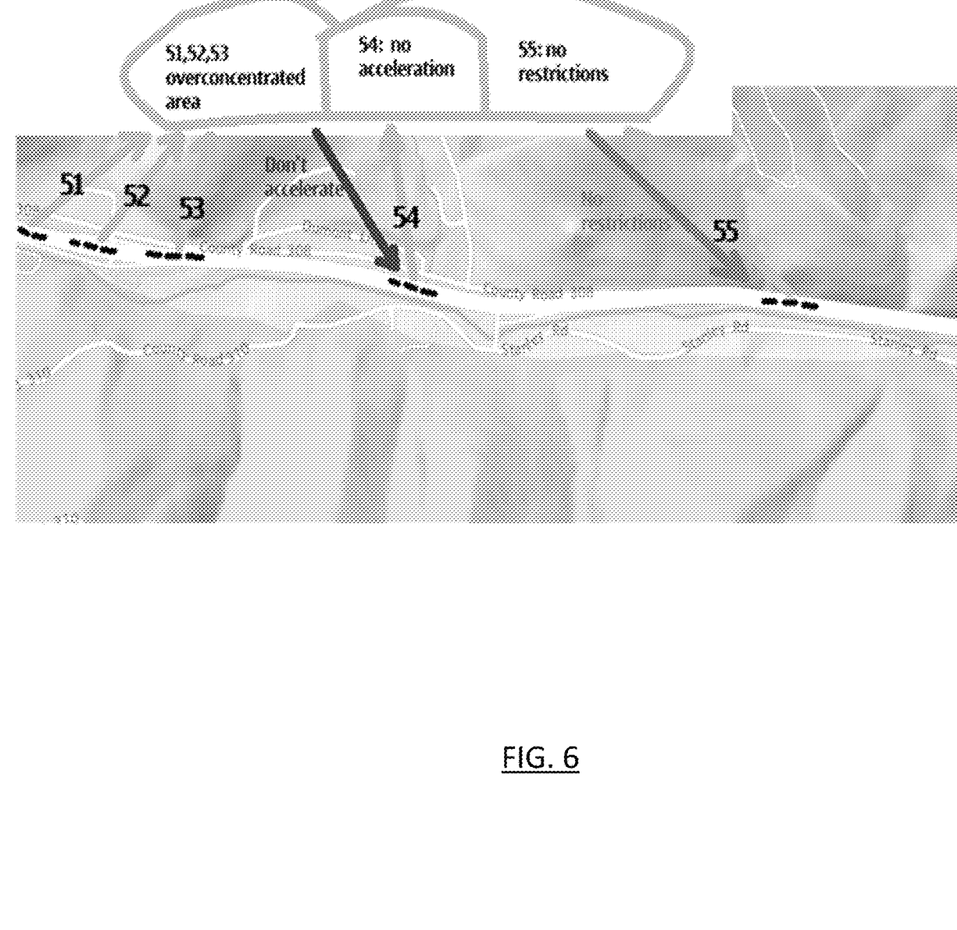
FIG. 6 is an illustration of a plurality of platoons operating along a route according to an example embodiment of the present invention.

FIG. 6 illustrates an example embodiment of dynamic platoon monitoring in which platoons 51, 52, and 53 are densely arranged along a short distance of the route, where all illustrated platoons are moving from left to right of the image. Platoon 51 may be instructed to slow to provide more space to platoons 52 and 53, whereby the leader of platoon 51 communicates with the other platoon members that they will be decreasing speed. The leader may reduce speed while the following vehicles may reduce speed either as directed from the leader or as directed by the platoon matching exchange. Optionally, the following vehicles may not decrease speed based on instruction, but instead maintain a predetermined following distance or following distance range, wherein upon the leading vehicle decreasing speed, the following vehicles may decrease speed to maintain the appropriate following distance. The vehicles in the platoon may operate differently, such that one vehicle that is fully autonomous may receive an indication that they are to decrease speed from the leader or the platoon matching exchange, while another vehicle in the platoon may be semi-autonomous and may have reactionary deceleration based on the actual speed of the vehicle that it is following.

Referring again to FIG. 6, platoon 54 may be instructed to not accelerate. This instruction may be received from the platoon management exchange or directed by the leader of the platoon. The instruction may be the result of information of the roadway ahead, such as a weather condition, an accident, one or more upcoming turns, a steep downhill grade, etc. While some of these reasons may be based on map topography and may be static and unchanging, other factors such as the weather and incident information may be dynamic and responsive to real world events, which may be reported via crowdsourced data or platoons traveling the route ahead of platoon 54. Platoon 54 may also be instructed to not accelerate to maintain a safe distance from platoon 55. Platoon 55, with no platoons in front of it and with no incidents, adverse weather, or roadway geometry issues, may be unrestricted to travel at a maximum safe speed or maximum speed as regulated on the particular road.

Vehicles in a platoon may encounter issues that affect their participation in the platoon. For example, a vehicle may have mechanical trouble, whereupon the vehicle may broadcast an intent to depart the platoon. Optionally, a vehicle may determine, based on sensor information and vehicle status, that it is no longer safe to remain in a platoon. Optionally, a vehicle may determine, or the platoon server may determine, based on an environmental condition (e.g., weather changes) and vehicle status, that it is no longer safe to remain in a platoon. A vehicle or platoon server may optionally determine, based on driver behavior (e.g., a driver is too drowsy as determined from driver monitoring sensors) information and vehicle status, that it is no longer safe to remain in a platoon. In such a situation, a message may be broadcast to all vehicles in the platoon and to the platoon matching exchange at the platoon server. The remaining vehicles of the platoon may then make course corrections to enable the departing vehicle safe passage from the platoon. The request for emergency separation from a platoon may include a reason for the desired separation from the platoon. These reasons may have a hierarchy such that an emergency separation request may be denied based upon the profile of other vehicles in the platoon. If an emergency separation is requested for a low-priority reason and the request is from the platoon leader, the platoon server may deny the request if no other potential leaders are available in the platoon.

Figure 7:
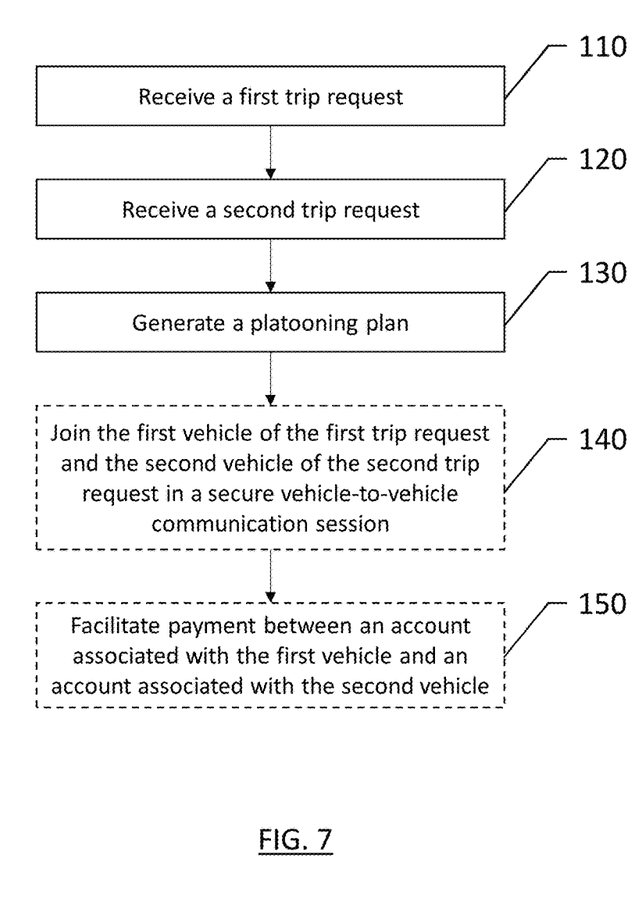
FIG. 7 is a flowchart of a method for joining vehicles together into a platoon according to an example embodiment of the present invention.

FIG. 7 illustrates an example flowchart of the example operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 26 of an apparatus employing an embodiment of the present invention and executed by a processor 24 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIG. 7, when executed, convert a computer or processing circuitry into a particular machine configured to perform an example embodiment of the present invention. Accordingly, the operations of FIG. 7 define an algorithm for configuring a computer or processing to perform an example embodiment. In some cases, a general purpose computer may be provided with an instance of the processor which performs the algorithms of FIG. 7 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included. It should be appreciated that each of the modifications, optional additions or amplifications below may be included with the operations above either alone or in combination with any others among the features described herein.

FIG. 7 is an example flowchart illustrating a method of operating an example computing system to join vehicles together into a platoon. As shown at block 110, a first trip request may be received, for example, by platoon server 12. The first trip request may include a trip destination, a first vehicle identification, and associated preferences. A second trip request may be received at 120 including a second vehicle identification, a trip destination, and associated preferences. At 130, a platooning plan may be generated based on the first trip request and the second trip request, where the platooning plan includes assignment of a platoon leader to the first vehicle identification and a joining location where the first vehicle is to form a platoon with the second vehicle. Further embodiments may include optional features which may or may not be required, as illustrated in the flowchart of FIG. 7 in broken lines. For example, the platoon server may join the first vehicle of the first trip request and the second vehicle of the second trip request in a secure vehicle-to-vehicle communication session as shown at 140. Payment between an account associated with the first vehicle and an account associated with the second vehicle may be facilitated by the platoon server as shown at 150.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving, at a server, a first trip request including a first vehicle identification, first vehicle origin, first vehicle trip destination, and associated first vehicle preferences;
   receiving, at the server, a second trip request including a second vehicle identification, second vehicle origin, second vehicle trip destination, and associated second vehicle preferences;
   receiving, at the server, a third trip request including a third vehicle identification, third vehicle origin, third vehicle trip destination, and associated third vehicle preferences;
   generating, by the server, a platooning plan including assignment of a platoon leader and a platoon order of vehicles, wherein the platooning plan includes a first joining location where a vehicle of the first vehicle identification is to form a platoon with a vehicle of the second vehicle identification, and a second joining location where a vehicle of the third vehicle identification is to join the platoon of the vehicle of the first vehicle identification and the vehicle of the second vehicle identification, wherein the platoon order of vehicles is determined, at least in part, on an origin of the vehicles and a trip destination of the vehicles in the platoon;

determining, by the server, a maximum number of vehicles for the platoon, wherein the maximum number of vehicles is based on vehicle size;

providing the platooning plan to vehicles of the first vehicle identification, the second vehicle identification, and the third vehicle identification; and providing route guidance to each of the vehicles to follow the platooning plan.

2. The method of claim 1, further comprising:
joining the vehicle of the first vehicle identification and the vehicle of the second vehicle identification in a secure vehicle-to-vehicle communication session.

3. The method of claim 2, further comprising:
facilitating payment between an account associated with the first vehicle identification and an account associated with the second vehicle identification.

4. The method of claim 1, wherein the associated preferences comprises a planned route, planned stops, and a desired time of arrival at the trip destination, and wherein the platooning plan includes a platoon route, platoon planned stops, and a platoon target arrival time generated in response to the associated preferences of the first trip request and the second trip request.

5. The method of claim 1, further comprising:
sending the platooning plan to the platoon leader; and
directing the vehicle corresponding to the first vehicle identification to the joining location.

6. An apparatus comprising at least one processor and at least one memory including computer program code, the at least one memory and the computer program code configured to, with the processor, cause the apparatus to at least:
receive a first trip request including a first vehicle identification, first vehicle origin, first vehicle trip destination, and associated first vehicle preferences;
receive a second trip request including a second vehicle identification, second vehicle origin, second vehicle trip destination, and associated second vehicle preferences;
receive a third trip request including a third vehicle identification, third vehicle origin, third vehicle trip destination, and associated third vehicle preferences;
generate a platooning plan including assignment of a platoon leader and a platoon order of vehicles, wherein the platooning plan includes a first joining location where a vehicle of the first vehicle identification is to form a platoon with a vehicle of the second vehicle identification, and a second joining location where a vehicle of the third vehicle identification is to join the platoon of the vehicle of the first vehicle identification and the vehicle of the second vehicle identification, wherein the platoon order of vehicles is determined, at least in part, on an origin of the vehicles and a trip destination of the vehicles;
determine, by the server, a maximum number of vehicles for the platoon, wherein the maximum number of vehicles is based on vehicle size;
provide the platooning plan to vehicles of the first vehicle identification, the second vehicle identification, and the third vehicle identification; and
provide route guidance to each of the vehicles to follow the platooning plan.

7. The apparatus of claim 6, wherein the apparatus is further caused to:
join the vehicle of the first vehicle identification and the vehicle of the second vehicle identification in a secure vehicle-to-vehicle communication session.

8. The apparatus of claim 7, wherein the apparatus is further caused to:
facilitate payment between an account associated with the first vehicle identification and an account associated with the second vehicle identification.

9. The apparatus of claim 6, wherein the associated preferences comprises a planned route, planned stops, and a desired time of arrival at the trip destination, and wherein the platooning plan includes a platoon route, platoon planned stops, and a platoon target arrival time generated in response to the associated preferences of the first trip request and the second trip request.

10. The apparatus of claim 6, wherein the apparatus is further caused to:
send the platooning plan to the platoon leader; and
direct the vehicle corresponding to the first vehicle identification to the joining location.

11. The apparatus of claim 10, wherein the apparatus is further caused to:
cause the vehicle corresponding to the first vehicle identification to proceed to the first joining location.

12. A computer program product comprising at least one non-transitory computer-readable storage medium having computer-executable program code portions stored therein, the computer-executable program code portions comprising program code instructions for:
receiving, by a server, a first trip request including a first vehicle identification, first vehicle origin, first vehicle trip destination, and associated first vehicle preferences;
receiving, by the server, a second trip request including a second vehicle identification, second vehicle origin, second vehicle trip destination, and associated second vehicle preferences;
receiving, by the server, a third trip request including a third vehicle identification, third vehicle origin, third vehicle trip destination, and associated third vehicle preferences;
generating, by the server, a platooning plan including assignment of a platoon leader and a platoon order of vehicles, wherein the platooning plan includes a first joining location where a vehicle of the first vehicle identification is to form a platoon with a vehicle of the second vehicle identification, and a second joining location where a vehicle of the third vehicle identification is to join the platoon of the vehicle of the first vehicle identification and the vehicle of the second vehicle identification, wherein the platoon order of vehicles is determined, at least in part, on an origin of the vehicles and a trip destination of the vehicles;
determine, by the server, a maximum number of vehicles for the platoon, wherein the maximum number of vehicles is based on vehicle size;
provide the platooning plan to vehicles of the first vehicle identification, the second vehicle identification, and the third vehicle identification; and
provide route guidance to each of the vehicles to follow the platooning plan.

13. The computer program product of claim 12, further comprising program code instructions for:

joining the vehicle of the first vehicle identification and the vehicle of the second vehicle identification in a secure vehicle-to-vehicle communication session.

14. The computer program product of claim 13, further comprising program code instructions for:
   facilitating payment between an account associated with the first vehicle identification and an account associated with the second vehicle identification.

15. The computer program product of claim 12, wherein the associated preferences comprises a planned route, planned stops, and a desired time of arrival at the trip destination, and wherein the platooning plan includes a platoon route, platoon planned stops, and a platoon target arrival time generated in response to the associated preferences of the first trip request and the second trip request.

16. The computer program product of claim 12, further comprising program code instructions for:
   sending the platooning plan to the platoon leader; and
   directing the vehicle corresponding to the first vehicle identification to the joining location.

17. The method of claim 1, wherein assignment of the platoon leader to lead the platoon is based, at least in part, on a determination by the server of fuel economy savings of assigning one vehicle to be platoon leader versus at least one other vehicle to be the platoon leader.

18. The method of claim 1, wherein assignment of the platoon leader to lead the platoon is based, at least in part, on a determination by the server of fuel economy savings comprising determining a drag coefficient of the first vehicle, a drag coefficient of the second vehicle, and a drag coefficient of the third vehicle and assigning a vehicle selected from a group consisting of the first vehicle, second vehicle, and third vehicle having the lowest drag coefficient as the platoon leader.

19. The method of claim 1, further comprising: causing control of vehicles in the platoon based on instructions from the platoon leader.

* * * * *